(12) United States Patent
Tian et al.

(10) Patent No.: US 11,769,199 B2
(45) Date of Patent: Sep. 26, 2023

(54) SYSTEM, METHOD, AND COMPUTER PROGRAM PRODUCT FOR NETWORK ANOMALY DETECTION

(71) Applicant: Visa International Service Association, San Francisco, CA (US)

(72) Inventors: Xiao Tian, Austin, TX (US); Chiranjeet Chetia, Round Rock, TX (US); Jianhua Huang, Cedar Park, TX (US); Marc Corbalan Vila, London (GB); Francisco Cardona Lema, London (GB); Stuart Mark Williams, London (GB)

(73) Assignee: Visa International Service Association, San Francisco, CA (US)

( * ) Notice: Subject to any disclaimer, the term of this patent is extended or adjusted under 35 U.S.C. 154(b) by 342 days.

(21) Appl. No.: 17/230,166

(22) Filed: Apr. 14, 2021

(65) Prior Publication Data

US 2022/0335514 A1 Oct. 20, 2022

(51) Int. Cl.
*G06Q 40/02* (2023.01)
*G06F 16/26* (2019.01)
(Continued)

(52) U.S. Cl.
CPC ............ *G06Q 40/02* (2013.01); *G06F 16/26* (2019.01); *G06Q 20/40* (2013.01); *H04L 43/045* (2013.01); *H04L 63/1425* (2013.01); *H04L 63/10* (2013.01)

(58) Field of Classification Search
USPC ........................................................ 726/22
See application file for complete search history.

(56) References Cited

U.S. PATENT DOCUMENTS

| 2011/0181595 A1 | 7/2011 | Nachmanson et al. |
| 2012/0030264 A1* | 2/2012 | Horn .................... G06F 3/04845 707/821 |

(Continued)

OTHER PUBLICATIONS

Guan et al, "Estimating Historical Functional Linear Models with a Nested Group Bridge Approach", Sep. 13, 2018, Cornell University, pp. 3-6 (Year: 2018).*

(Continued)

*Primary Examiner* — Sakinah White Taylor
(74) *Attorney, Agent, or Firm* — THE WEBB LAW FIRM

(57) ABSTRACT

Provided are a system, method, and computer program product for network anomaly detection. The method includes receiving event data associated with a plurality of events in a computer network. The method also includes determining nested groups of the event data representing tiers of an operational hierarchy. The method further includes generating display data to show a graphical representation of the event including a plurality of nested graphical nodes and at least one spline. Each graphical node is associated with a group or a computer node, each graphical node encompasses and/or is encompassed by another graphical node, a size of each graphical node is proportional to an aggregated parameter value of events associated therewith, each spline connects at least two graphical nodes and includes a curve that passes through a common graphical node, and each spline is associated with a communication between at least two computer nodes.

20 Claims, 11 Drawing Sheets

(51) Int. Cl.
*H04L 43/045* (2022.01)
*H04L 9/40* (2022.01)
*G06Q 20/40* (2012.01)

(56) References Cited

U.S. PATENT DOCUMENTS

| | | | |
|---|---|---|---|
| 2014/0115169 A1* | 4/2014 | Gao | H04W 72/00 709/226 |
| 2015/0180891 A1* | 6/2015 | Seward | H04L 63/1416 726/22 |
| 2015/0256526 A1* | 9/2015 | Biegala | H04L 63/08 726/6 |
| 2017/0091260 A1* | 3/2017 | Henocque | G06F 3/0481 |
| 2019/0370812 A1 | 12/2019 | Kandasamy et al. | |
| 2020/0034852 A1 | 1/2020 | Lim | |
| 2020/0120151 A1 | 4/2020 | Xie et al. | |
| 2021/0037035 A1 | 2/2021 | Graul | |
| 2021/0342836 A1 | 11/2021 | Celia et al. | |

OTHER PUBLICATIONS

Gansner et al., "Multilevel Agglomerative Edge Bundling for Visualizing Large Graphs", IEEE Pacific Visualization Symposium, 2011, 8 pages.

Hamilton et al., "Inductive Representation Learning on Large Graphs", 31st Conference on Neural Information Processing Systems (NIPS), 2017, 19 pages, Long Beach, CA.

\* cited by examiner

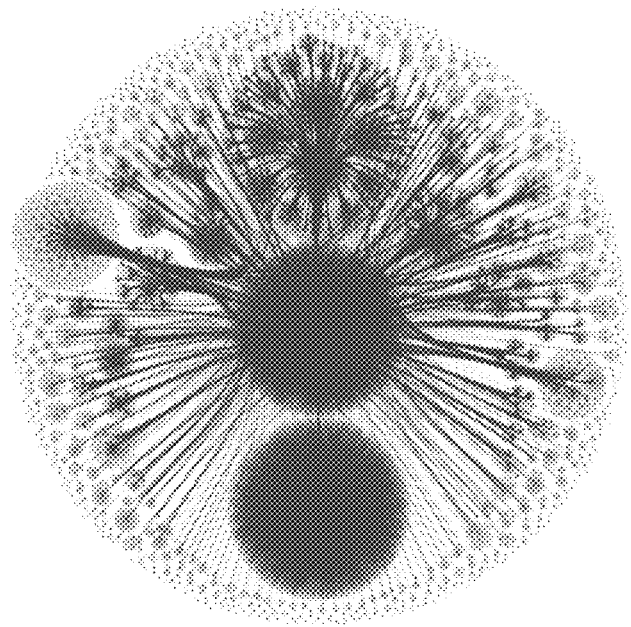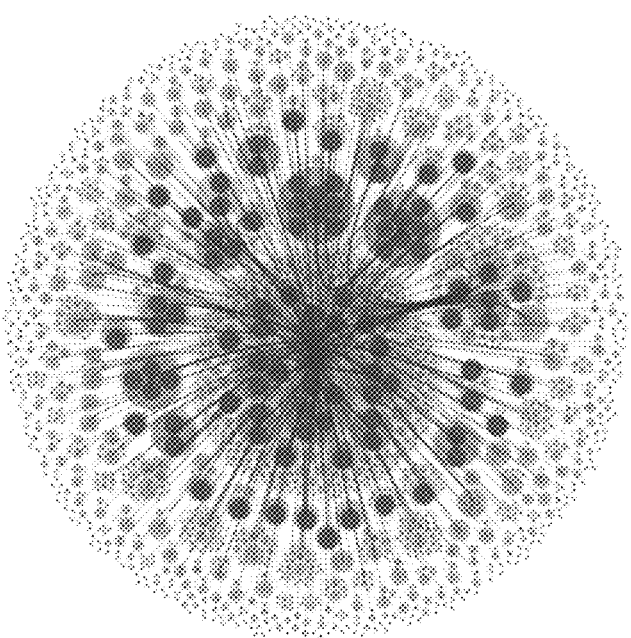
FIG. 11

SYSTEM, METHOD, AND COMPUTER PROGRAM PRODUCT FOR NETWORK ANOMALY DETECTION

BACKGROUND

1. Field

This disclosure relates generally to computer network security, and, in some non-limiting embodiments or aspects, to a system, method, and computer program product for computer network communication anomaly detection and response.

2. Technical Considerations

As the complexity of computer networks increases, so does the complexity of identifying anomalous activity therein. For example, if a network failure or malicious activity creates anomalous communication activity for one or more groups of nodes in a large-scale network, it may be difficult to timely identify and rectify the underlying issue. For every second that is required to identify anomalous activity in a network, computer resources may be wasted. Processing capacity, computer memory, and communication bandwidth may be consumed by anomalous activity within a network. Furthermore, the relationships of devices inside large-scale networks can be vast and challenging to represent for detection of anomalous activity by technicians and/or management systems.

There is a need in the art for a technical solution that saliently represents a computer network and activity therein so that relationships within a network and local properties of network components can be shown and analyzed. There is a further need for a tool to accurately and intuitively represent network activity such that anomalous activity can be readily detected by users and/or monitoring systems and rectified.

SUMMARY

Accordingly, it is an object of the presently disclosed subject matter to provide systems, methods, and computer program products for network anomaly detection.

According to some non-limiting embodiments or aspects, provided is a method for network anomaly detection. The method may include receiving, with at least one processor, event data associated with a plurality of events in a computer network in a sample time period. The event data may include an aggregable parameter and each event of the plurality of events may include a communication between at least two network computer nodes of a plurality of computer nodes in the computer network. The method may also include determining, with at least one processor, a plurality of nested groups of the event data. A lowest order group of the plurality of nested groups may include a group of at least one computer node of the plurality of computer nodes. Each group of the plurality of nested groups having a higher order than the lowest order group may include, nested therein, at least one other group of the plurality of nested groups. The method may further include generating, with at least one processor, display data configured to cause a display of a computing device to show a first graphical representation of the event data. The first graphical representation may include a plurality of nested graphical nodes and at least one spline. Each graphical node of the plurality of nested graphical nodes may be associated with a group of the plurality of nested groups or a computer node of the plurality of computer nodes. Each graphical node of the plurality of nested graphical nodes may encompass and/or be encompassed by another graphical node of the plurality of nested graphical nodes. A size of each graphical node of the plurality of nested graphical nodes may be proportional to an aggregated value of the aggregable parameter of each event associated with a computer node associated with the graphical node or a plurality of computer nodes included in a group associated with the graphical node. Each spline of the at least one spline may have endpoints including a pair of graphical nodes of the plurality of nested graphical nodes and may include a curve that is generated from a path passing through a common graphical node that encompasses each graphical node of the pair of graphical nodes. Each spline of the at least one spline may be associated with a communication between at least two computer nodes of the plurality of computer nodes.

In further non-limiting embodiments or aspects, the plurality of events may include a plurality of transactions, the computer network may include an electronic payment processing network, the event data may include transaction data associated with the plurality of transactions, and the aggregable parameter may include transaction value. Each computer node of the plurality of computer nodes may include a computing device configured to manage transactions to and from at least one transaction account.

In further non-limiting embodiments or aspects, the method may include receiving, with at least one processor, an identification of an anomalous graphical node of the plurality of nested graphical nodes from a user interface of the computing device. The method may further include declining, with at least one processor in a time period subsequent to the sample time period, at least one transaction between computer nodes in a group of the plurality of nested groups associated with the anomalous graphical node or with a graphical node encompassing the anomalous graphical node.

In further non-limiting embodiments or aspects, the method may include declining all ongoing transactions between computer nodes in a group of the plurality of nested groups associated with the anomalous graphical node or with a graphical node encompassing the anomalous graphical node.

In further non-limiting embodiments or aspects, the method may include determining, with at least one processor, an identification of an anomalous graphical node based on a size of the anomalous graphical node satisfying a threshold value relative to an average size of graphical nodes associated with a same group that is associated with the anomalous graphical node.

In further non-limiting embodiments or aspects, the method may include determining, with at least one processor, an identification of an anomalous graphical node based on a size of the anomalous graphical node generated from event data in the sample time period satisfying a threshold value relative to an average size of the anomalous graphical node generated from event data in a plurality of prior time periods.

In further non-limiting embodiments or aspects, the method may include receiving, with at least one processor, new event data associated with a plurality of new events in the computer network in a subsequent time period after the sample time period. The method may also include generating, with at least one processor, new display data configured to cause the display of the computing device to show a new graphical representation of the new event data. The new graphical representation may be displayed using a same set of graphical parameters as the first graphical representation. The new graphical representation may be displayed in time order relative to the first graphical representation. The method may further include receiving, with at least one processor, an identification of an anomalous graphical node in the new graphical representation from a user interface of the computing device, wherein the identification is determined based on a size of the anomalous graphical node being increased in the new graphical representation relative to the first graphical representation. The method may further include declining, with at least one processor, at least one transaction between computer nodes in a group of the plurality of nested groups associated with the anomalous graphical node or with a graphical node encompassing the anomalous graphical node.

According to non-limiting embodiments or aspects, provided is a system for network anomaly detection. The system may include a server including at least one processor. The server may be programmed and/or configured to receive event data associated with a plurality of events in a computer network in a sample time period. The event data may include an aggregable parameter and each event of the plurality of events may include a communication between at least two network computer nodes of a plurality of computer nodes in the computer network. The server may also be programmed and/or configured to determine a plurality of nested groups of the event data. A lowest order group of the plurality of nested groups may include a group of at least one computer node of the plurality of computer nodes. Each group of the plurality of nested groups having a higher order than the lowest order group may include, nested therein, at least one other group of the plurality of nested groups. The server may further be programmed and/or configured to generate display data configured to cause a display of a computing device to show a first graphical representation of the event data. The first graphical representation may include a plurality of nested graphical nodes and at least one spline. Each graphical node of the plurality of nested graphical nodes may be associated with a group of the plurality of nested groups or a computer node of the plurality of computer nodes. Each graphical node of the plurality of nested graphical nodes may encompass and/or be encompassed by another graphical node of the plurality of nested graphical nodes. A size of each graphical node of the plurality of nested graphical nodes may be proportional to an aggregated value of the aggregable parameter of each event associated with a computer node associated with the graphical node or a plurality of computer nodes included in a group associated with the graphical node. Each spline of the at least one spline may have endpoints including a pair of graphical nodes of the plurality of nested graphical nodes and may include a curve that is generated from a path passing through a common graphical node that encompasses each graphical node of the pair of graphical nodes. Each spline of the at least one spline may be associated with a communication between at least two computer nodes of the plurality of computer nodes.

In further non-limiting embodiments or aspects, the plurality of events may include a plurality of transactions, the computer network may include an electronic payment processing network, the event data may include transaction data associated with the plurality of transactions, and the aggregable parameter may include transaction value.

In further non-limiting embodiments or aspects, the server may be further programmed and/or configured to receive an identification of an anomalous graphical node of the plurality of nested graphical nodes from a user interface of the computing device. The server may be further programmed and/or configured to decline, in a time period subsequent to the sample time period, at least one transaction between computer nodes in a group of the plurality of nested groups associated with the anomalous graphical node or with a graphical node encompassing the anomalous graphical node.

In further non-limiting embodiments or aspects, the server may be further programmed and/or configured to determine an identification of an anomalous graphical node based on a size of the anomalous graphical node satisfying a threshold value relative to an average size of graphical nodes associated with a same group that is associated with the anomalous graphical node.

In further non-limiting embodiments or aspects, the server is further programmed and/or configured to determine an identification of an anomalous graphical node based on a size of the anomalous graphical node generated from event data in the sample time period satisfying a threshold value relative to an average size of the anomalous graphical node generated from event data in a plurality of prior time periods.

In further non-limiting embodiments or aspects, the server may be further programmed and/or configured to receive new event data associated with a plurality of new events in the computer network in a subsequent time period after the sample time period. The server may be further programmed and/or configured to generate new display data configured to cause the display of the computing device to show a new graphical representation of the new event data. The new graphical representation may be displayed using a same set of graphical parameters as the first graphical representation. The new graphical representation may be displayed in time order relative to the first graphical representation. The server may be further programmed and/or configured to receive an identification of an anomalous graphical node in the new graphical representation from a user interface of the computing device. The identification may be determined based on a size of the anomalous graphical node being increased in the new graphical representation relative to the first graphical representation. The server may be further programmed and/or configured to decline at least one transaction between computer nodes in a group of the plurality of nested groups associated with the anomalous graphical node or with a graphical node encompassing the anomalous graphical node.

According to non-limiting embodiments or aspects, provided is a computer program product for network anomaly detection. The computer program product may include at least one non-transitory computer-readable medium including program instructions that, when executed by at least one processor, cause the at least one processor to receive event data associated with a plurality of events in a computer network in a sample time period. The event data may include an aggregable parameter and each event of the plurality of events may include a communication between at least two network computer nodes of a plurality of computer nodes in the computer network. The program instructions may further cause the at least one processor to determine a plurality of nested groups of the event data. A lowest order group of the plurality of nested groups may include a group of at least one computer node of the plurality of computer nodes. Each group of the plurality of nested groups having a higher order than the lowest order group may include, nested therein, at least one other group of the plurality of nested groups. The program instructions may further cause the at least one processor to generate display data configured to cause a display of a computing device to show a first graphical representation of the event data. The first graphical representation may include a plurality of nested graphical nodes and at least one spline. Each graphical node of the plurality of nested graphical nodes may be associated with a group of the plurality of nested groups or a computer node of the plurality of computer nodes. Each graphical node of the plurality of nested graphical nodes may encompass and/or be encompassed by another graphical node of the plurality of nested graphical nodes. A size of each graphical node of the plurality of nested graphical nodes may be proportional to an aggregated value of the aggregable parameter of each event associated with a computer node associated with the graphical node or a plurality of computer nodes included in a group associated with the graphical node. Each spline of the at least one spline may have endpoints including a pair of graphical nodes of the plurality of nested graphical nodes and may include a curve that is generated from a path passing through a common graphical node that encompasses each graphical node of the pair of graphical nodes. Each spline of the at least one spline may be associated with a communication between at least two computer nodes of the plurality of computer nodes.

In further non-limiting embodiments or aspects, the plurality of events may include a plurality of transactions, the computer network may include an electronic payment processing network, the event data may include transaction data associated with the plurality of transactions, and the aggregable parameter may include transaction value.

In further non-limiting embodiments or aspects, the program instructions may further cause the at least one processor to receive an identification of an anomalous graphical node of the plurality of nested graphical nodes from a user interface of the computing device. The program instructions may further cause the at least one processor to decline, in a time period subsequent to the sample time period, at least one transaction between computer nodes in a group of the plurality of nested groups associated with the anomalous graphical node or with a graphical node encompassing the anomalous graphical node.

In further non-limiting embodiments or aspects, the program instructions may further cause the at least one processor to determine an identification of an anomalous graphical node based on a size of the anomalous graphical node satisfying a threshold value relative to an average size of graphical nodes associated with a same group that is associated with the anomalous graphical node.

In further non-limiting embodiments or aspects, the program instructions may further cause the at least one processor to determine an identification of an anomalous graphical node based on a size of the anomalous graphical node generated from event data in the sample time period satisfying a threshold value relative to an average size of the anomalous graphical node generated from event data in a plurality of prior time periods.

In further non-limiting embodiments or aspects, the program instructions may further cause the at least one processor to receive new event data associated with a plurality of new events in the computer network in a subsequent time period after the sample time period. The program instructions may further cause the at least one processor to generate new display data configured to cause the display of the computing device to show a new graphical representation of the new event data. The new graphical representation may be displayed using a same set of graphical parameters as the first graphical representation. The new graphical representation may be displayed in time order relative to the first graphical representation. The program instructions may further cause the at least one processor to receive an identification of an anomalous graphical node in the new graphical representation from a user interface of the computing device. The identification may be determined based on a size of the anomalous graphical node being increased in the new graphical representation relative to the first graphical representation. The program instructions may further cause the at least one processor to decline at least one transaction between computer nodes in a group of the plurality of nested groups associated with the anomalous graphical node or with a graphical node encompassing the anomalous graphical node.

Further embodiments or aspects are set forth in the following numbered clauses:

Clause 1: A computer-implemented method comprising: receiving, with at least one processor, event data associated with a plurality of events in a computer network in a sample time period, the event data comprising an aggregable parameter and each event of the plurality of events comprising a communication between at least two network computer nodes of a plurality of computer nodes in the computer network; determining, with at least one processor, a plurality of nested groups of the event data, wherein a lowest order group of the plurality of nested groups comprises a group of at least one computer node of the plurality of computer nodes, and wherein each group of the plurality of nested groups having a higher order than the lowest order group comprises, nested therein, at least one other group of the plurality of nested groups; and generating, with at least one processor, display data configured to cause a display of a computing device to show a first graphical representation of the event data, the first graphical representation comprising a plurality of nested graphical nodes and at least one spline; wherein, each graphical node of the plurality of nested graphical nodes is associated with a group of the plurality of nested groups or a computer node of the plurality of computer nodes, each graphical node of the plurality of nested graphical nodes encompasses and/or is encompassed by another graphical node of the plurality of nested graphical nodes, a size of each graphical node of the plurality of nested graphical nodes is proportional to an aggregated value of the aggregable parameter of each event associated with a computer node associated with the graphical node or a plurality of computer nodes comprised by a group associated with the graphical node, each spline of the at least one spline has endpoints comprising a pair of graphical nodes of the plurality of nested graphical nodes and comprises a curve that is generated from a path passing through a common graphical node that encompasses each graphical node of the pair of graphical nodes, and wherein each spline of the at least one spline is associated with a communication between at least two computer nodes of the plurality of computer nodes.

Clause 2: The method of clause 1, wherein the plurality of events comprise a plurality of transactions, the computer network comprises an electronic payment processing network, the event data comprises transaction data associated with the plurality of transactions, and the aggregable parameter comprises transaction value.

Clause 3: The method of clause 1 or 2, wherein each computer node of the plurality of computer nodes comprises a computing device configured to manage transactions to and from at least one transaction account.

Clause 4: The method of any of clauses 1-3, further comprising: receiving, with at least one processor, an identification of an anomalous graphical node of the plurality of nested graphical nodes from a user interface of the computing device; and declining, with at least one processor in a time period subsequent to the sample time period, at least one transaction between computer nodes in a group of the plurality of nested groups associated with the anomalous graphical node or with a graphical node encompassing the anomalous graphical node.

Clause 5: The method of any of clauses 1-4, further comprising declining all ongoing transactions between computer nodes in a group of the plurality of nested groups associated with the anomalous graphical node or with a graphical node encompassing the anomalous graphical node.

Clause 6: The method of any of clauses 1-5, further comprising determining, with at least one processor, an identification of an anomalous graphical node based on a size of the anomalous graphical node satisfying a threshold value relative to an average size of graphical nodes associated with a same group that is associated with the anomalous graphical node.

Clause 7: The method of any of clauses 1-6, further comprising determining, with at least one processor, an identification of an anomalous graphical node based on a size of the anomalous graphical node generated from event data in the sample time period satisfying a threshold value relative to an average size of the anomalous graphical node generated from event data in a plurality of prior time periods.

Clause 8: The method of any of clauses 1-7, further comprising: receiving, with at least one processor, new event data associated with a plurality of new events in the computer network in a subsequent time period after the sample time period; generating, with at least one processor, new display data configured to cause the display of the computing device to show a new graphical representation of the new event data, wherein the new graphical representation is displayed using a same set of graphical parameters as the first graphical representation, and wherein the new graphical representation is displayed in time order relative to the first graphical representation; receiving, with at least one processor, an identification of an anomalous graphical node in the new graphical representation from a user interface of the computing device, wherein the identification is determined based on a size of the anomalous graphical node being increased in the new graphical representation relative to the first graphical representation; and declining, with at least one processor, at least one transaction between computer nodes in a group of the plurality of nested groups associated with the anomalous graphical node or with a graphical node encompassing the anomalous graphical node.

Clause 9: A system comprising a server comprising at least one processor, the server being programmed and/or configured to: receive event data associated with a plurality of events in a computer network in a sample time period, the event data comprising an aggregable parameter and each event of the plurality of events comprising a communication between at least two network computer nodes of a plurality of computer nodes in the computer network; determine a plurality of nested groups of the event data, wherein a lowest order group of the plurality of nested groups comprises a group of at least one computer node of the plurality of computer nodes, and wherein each group of the plurality of nested groups having a higher order than the lowest order group comprises, nested therein, at least one other group of the plurality of nested groups; and generate display data configured to cause a display of a computing device to show a first graphical representation of the event data, the first graphical representation comprising a plurality of nested graphical nodes and at least one spline; wherein, each graphical node of the plurality of nested graphical nodes is associated with a group of the plurality of nested groups or a computer node of the plurality of computer nodes, each graphical node of the plurality of nested graphical nodes encompasses and/or is encompassed by another graphical node of the plurality of nested graphical nodes, a size of each graphical node of the plurality of nested graphical nodes is proportional to an aggregated value of the aggregable parameter of each event associated with a computer node associated with the graphical node or a plurality of computer nodes comprised by a group associated with the graphical node, each spline of the at least one spline has endpoints comprising a pair of graphical nodes of the plurality of nested graphical nodes and comprises a curve that is generated from a path passing through a common graphical node that encompasses each graphical node of the pair of graphical nodes, and each spline of the at least one spline is associated with a communication between at least two computer nodes of the plurality of computer nodes.

Clause 10: The system of clause 9, wherein the plurality of events comprise a plurality of transactions, the computer network comprises an electronic payment processing network, the event data comprises transaction data associated with the plurality of transactions, and the aggregable parameter comprises transaction value.

Clause 11: The system of clause 9 or 10, wherein the server is further programmed and/or configured to: receive an identification of an anomalous graphical node of the plurality of nested graphical nodes from a user interface of the computing device; and decline, in a time period subsequent to the sample time period, at least one transaction between computer nodes in a group of the plurality of nested groups associated with the anomalous graphical node or with a graphical node encompassing the anomalous graphical node.

Clause 12: The system of any of clauses 9-11, wherein the server is further programmed and/or configured to determine an identification of an anomalous graphical node based on a size of the anomalous graphical node satisfying a threshold value relative to an average size of graphical nodes associated with a same group that is associated with the anomalous graphical node.

Clause 13: The system of any of clauses 9-12, wherein the server is further programmed and/or configured to determine an identification of an anomalous graphical node based on a size of the anomalous graphical node generated from event data in the sample time period satisfying a threshold value relative to an average size of the anomalous graphical node generated from event data in a plurality of prior time periods.

Clause 14: The system of any of clauses 9-13, wherein the server is further programmed and/or configured to: receive new event data associated with a plurality of new events in the computer network in a subsequent time period after the sample time period; generate new display data configured to cause the display of the computing device to show a new graphical representation of the new event data, wherein the new graphical representation is displayed using a same set of graphical parameters as the first graphical representation, and wherein the new graphical representation is displayed in time order relative to the first graphical representation; receive an identification of an anomalous graphical node in the new graphical representation from a user interface of the computing device, wherein the identification is determined based on a size of the anomalous graphical node being increased in the new graphical representation relative to the first graphical representation; and decline at least one transaction between computer nodes in a group of the plurality of nested groups associated with the anomalous graphical node or with a graphical node encompassing the anomalous graphical node.

Clause 15: A computer program product comprising at least one non-transitory computer-readable medium including program instructions that, when executed by at least one processor, cause the at least one processor to: receive event data associated with a plurality of events in a computer network in a sample time period, the event data comprising an aggregable parameter and each event of the plurality of events comprising a communication between at least two network computer nodes of a plurality of computer nodes in the computer network; determine a plurality of nested groups of the event data, wherein a lowest order group of the plurality of nested groups comprises a group of at least one computer node of the plurality of computer nodes, and wherein each group of the plurality of nested groups having a higher order than the lowest order group comprises, nested therein, at least one other group of the plurality of nested groups; and generate display data configured to cause a display of a computing device to show a first graphical representation of the event data, the first graphical representation comprising a plurality of nested graphical nodes and at least one spline; wherein, each graphical node of the plurality of nested graphical nodes is associated with a group of the plurality of nested groups or a computer node of the plurality of computer nodes, each graphical node of the plurality of nested graphical nodes encompasses and/or is encompassed by another graphical node of the plurality of nested graphical nodes, a size of each graphical node of the plurality of nested graphical nodes is proportional to an aggregated value of the aggregable parameter of each event associated with a computer node associated with the graphical node or a plurality of computer nodes comprised by a group associated with the graphical node, each spline of the at least one spline has endpoints comprising a pair of graphical nodes of the plurality of nested graphical nodes and comprises a curve that is generated from a path passing through a common graphical node that encompasses each graphical node of the pair of graphical nodes, and each spline of the at least one spline is associated with a communication between at least two computer nodes of the plurality of computer nodes.

Clause 16: The computer program product of clause 15, wherein the plurality of events comprise a plurality of transactions, the computer network comprises an electronic payment processing network, the event data comprises transaction data associated with the plurality of transactions, and the aggregable parameter comprises transaction value.

Clause 17: The computer program product of clause 15 or 16, wherein the program instructions further cause the at least one processor to: receive an identification of an anomalous graphical node of the plurality of nested graphical nodes from a user interface of the computing device; and decline, in a time period subsequent to the sample time period, at least one transaction between computer nodes in a group of the plurality of nested groups associated with the anomalous graphical node or with a graphical node encompassing the anomalous graphical node.

Clause 18: The computer program product of any of clauses 15-17, wherein the program instructions further cause the at least one processor to determine an identification of an anomalous graphical node based on a size of the anomalous graphical node satisfying a threshold value relative to an average size of graphical nodes associated with a same group that is associated with the anomalous graphical node.

Clause 19: The computer program product of any of clauses 15-18, wherein the program instructions further cause the at least one processor to determine an identification of an anomalous graphical node based on a size of the anomalous graphical node generated from event data in the sample time period satisfying a threshold value relative to an average size of the anomalous graphical node generated from event data in a plurality of prior time periods.

Clause 20: The computer program product of any of clauses 15-19, wherein the program instructions further cause the at least one processor to: receive new event data associated with a plurality of new events in the computer network in a subsequent time period after the sample time period; generate new display data configured to cause the display of the computing device to show a new graphical representation of the new event data, wherein the new graphical representation is displayed using a same set of graphical parameters as the first graphical representation, and wherein the new graphical representation is displayed in time order relative to the first graphical representation; receive an identification of an anomalous graphical node in the new graphical representation from a user interface of the computing device, wherein the identification is determined based on a size of the anomalous graphical node being increased in the new graphical representation relative to the first graphical representation; and decline at least one transaction between computer nodes in a group of the plurality of nested groups associated with the anomalous graphical node or with a graphical node encompassing the anomalous graphical node.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments or aspects that are illustrated in the accompanying schematic figures, in which:

FIG. 11 is an exemplary illustration of a user interface for displaying graphical representations of event data, according to non-limiting embodiments or aspects of a method for network anomaly detection.

DETAILED DESCRIPTION

Figure 1:
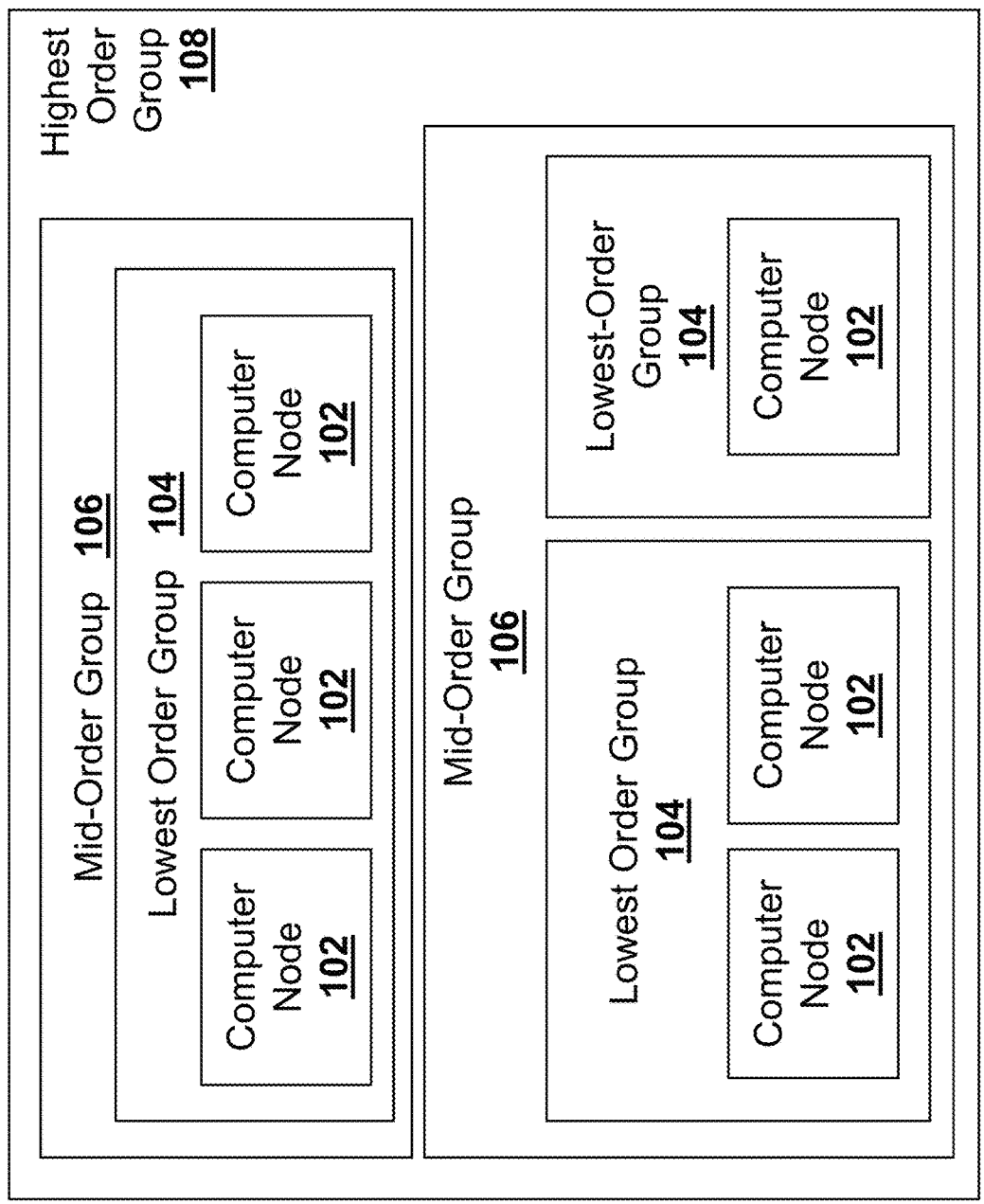
FIG. 1 is a diagram of a non-limiting embodiment or aspect of a network for which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "merchant" may refer to one or more entities (e.g., operators of retail businesses) that provide goods, services, and/or access to goods and/or services to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices which may be used by a merchant to initiate a transaction (e.g., a payment transaction), such as a transaction terminal. A POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like. As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction processing system" may refer to one or more computer systems operated by or on behalf of a transaction service provider, such as a transaction processing system executing one or more software applications. A transaction processing system may include one or more processors and, in some non-limiting embodiments or aspects, may be operated by or on behalf of a transaction service provider. The transaction processing system may process transactions in a payment transaction processing network, which may include one or more merchant systems, acquirer systems, issuer systems, payment gateways, and/or the like.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions that the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as point-of-sale (POS) devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

Non-limiting embodiments or aspects of the present disclosure are directed to systems, methods, and computer program products for network anomaly detection. Described systems and methods provide the technical improvement of representing network devices and communicative relationships such that local properties can be readily ascertained even at high-level graphical representations of the network. Through the salient depiction and improved aggregation of event data in a computer network, anomalous activities may be detected sooner and with greater accuracy. Anomalous activity (e.g., anomalies) may be instances of departures from expected or historic network activity such that system communications may vary significantly in comparison to a control. Anomalies may include, but are not limited to, network failures (e.g., hardware failure, software failure, etc.), malicious activity (e.g., fraudulent transactions, network attacks), or other drastic coordination between network devices that was not anticipated. Anomalies that are associated with sudden increases in network activity can strain and consume processing capacity, computer memory, and communication bandwidth until they are rectified. Furthermore, network failures may be associated with connectivity losses in certain areas of the network until full communication is restored. Because network resources may be managed based on anticipated network activity (e.g., number of servers, server uptime, bandwidth, open ports, etc.), anomalous activity may cause a network to operate less efficiently until an anomaly is identified and addressed. The proposed systems and methods allow for more efficient network operation.

Referring now to FIG. 1, illustrated is a diagram of a network 100 according to non-limiting embodiments or aspects of the present disclosure. A network 100 may include a plurality of computer nodes 102. Each computer node 102 may represent a computing device, or plurality of computing devices, that are programmed and/or configured to communicate with one or more other computer nodes 102 in the network 100. As described herein, the network 100, and event data for events occurring in the network 100, may be grouped into a plurality of nested groups 104, 106, 108. As shown, one or more computer nodes 102 may be associated with each lowest order group 104. One or more lowest order groups 104 may be associated with each mid-order group 106. One or more mid-order groups 106 may be associated with each highest order group 108. It will be appreciated that there may be more tiers of nested groups than the three sets of groups 104, 106, 108 shown in FIG. 1. As used herein, "lowest order" may refer to a group that contains computer nodes 102, but not another group. As used herein, "mid-order" may refer to a group that contains one or more other groups (e.g., a lowest order group 104) and is contained by one or more other groups (e.g., a highest order group 108). As used herein, "highest order" may refer to a group that contains one or more other groups (e.g., mid-order groups 106, which contain lowest order groups 104), but is not contained by another group. As used herein, "higher order" may refer to a group that is of a tier or grouping above that of another group, such as a mid-order group 106 relative to a lowest order group 104, or such as a highest order group 108 relative to a mid-order group 106 or a lowest order group 104.

Each group 104, 106, 108 may be associated with a tier of an operational hierarchy of the computer network. For example, a computer node 102 may be a computing device operated by a user, a lowest order group 104 may include a local area network (LAN), a mid-order group 106 may include a router associated with multiple LAN, and the highest order group 108 may be associated with an internet service provider (ISP) associated with multiple routers. It will be appreciated that a computer network may be modeled in various ways with various numbers of groups 104, 106, 108 according to operational paths and hierarchy hardware of the network.

Additionally or alternatively, each group may be delineated based on a common feature between the groups 104, 106, 108 and/or computer nodes 102 therein. For example, the computer nodes 102 or groups 104, 106 that are grouped together may be associated with each other based on geographic location (e.g., grouped by country, city, etc.), function (e.g., grouped by type of network communications handled), entity (e.g., grouped by business, financial institution, government, etc.), communication process flow (e.g., computing device, router, ISP, network service provider (NSP), etc.), and/or the like.

In non-limiting embodiments or aspects of an electronic payment processing network, each computer node 102 may represent a transaction account controlled by a computing device (e.g., an issuer system, an acquirer system, a financial institution system, etc.). Each transaction account may engage in one or more transactions, which may represent events in the network 100. Multiple transaction accounts may be associated with a banking identification number (BIN). The lowest order group 104 may be associated with BINs for multiple financial institutions. Multiple BINs may be associated with a bank identifier (BID). The mid-order group 106 may be associated with BIDs in an automated teller machine (ATM) network. The highest order group 108 may be associated with the ATM network.

The same set of event data may be grouped according to a different set of parameters. For example, the event data of the ATM network may be categorized from the perspective of ATM devices, rather than from the perspective of transaction accounts of financial institutions. A highest order group 108 may be associated by ATM network, a mid-order group 106 may be associated by country, a lowest order group 104 may be associated by city, and each computer node 102 may be an ATM device that facilitates multiple transactions. Accordingly, a common set of event data (e.g., transaction data of transactions between transaction accounts and ATM devices) may be grouped according to one or more sets of groups. The one or more sets of groups may be graphically represented separately or together, as further described below.

Figure 2:
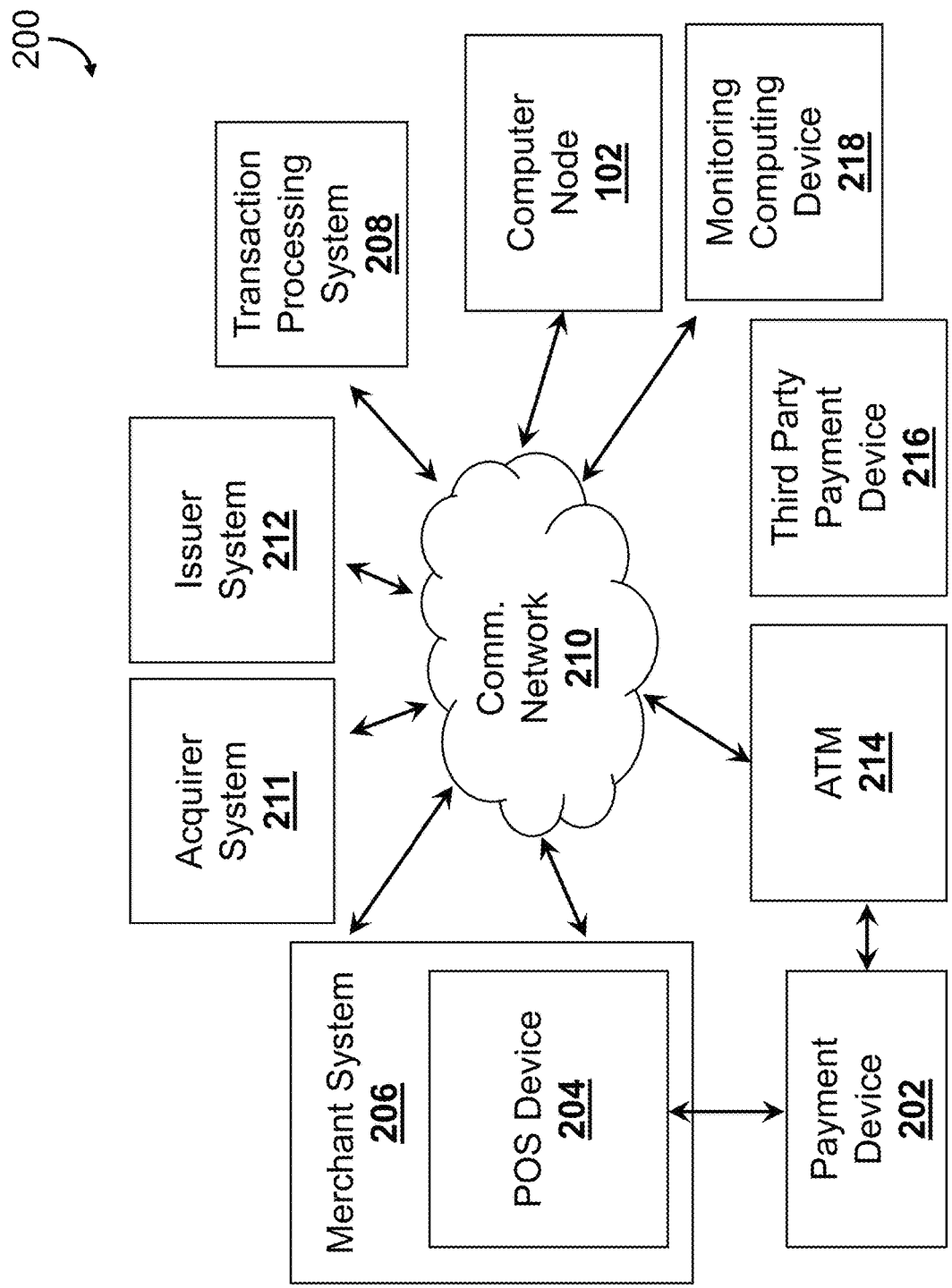
FIG. 2 is a diagram of a non-limiting embodiment or aspect of an environment in which systems, apparatuses, and/or methods, as described herein, may be implemented.

Referring now to FIG. 2, illustrated is a schematic diagram of an environment 200 according to non-limiting embodiments or aspects of the present disclosure. The environment 200 may include one or more of: payment device 202, POS device 204, merchant system 206, acquirer system 211, transaction processing system 208, issuer system 212, ATM 214, computer node 102, third party payment device 216, monitoring computing device 218, and a communication network 210.

Communication network 210 may include one or more wired and/or wireless networks. For example, communication network 210 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

Payment device 202 may include one or more devices capable of being in communication with POS device 204, ATM 214, transaction processing system 208, issuer system 212, and/or third party payment device 216 for the completion of transactions (e.g., purchase transactions, money withdrawal transactions, account-to-account (A2A) payment transactions, etc.). Third party payment device 216 may include one or more devices capable of being in communication with payment device 202, ATM 214, issuer system 212, transaction processing system 208, and/or other third party payment devices 216 for the completion of transactions. ATM 214 may include one or more devices capable of being in communication with payment device 202, third party payment device 216, and transaction processing system 208 to facilitate transaction account activities (e.g., balance check, withdrawal, deposit, etc.) via a user interface.

POS device 204 may include one or more devices capable of being in communication with a payment device 202, third party payment device 216, merchant system 206, acquirer system 211, transaction processing system 208, and/or other computing devices, such as a payment gateway. POS device 204 may be included in and/or associated with a merchant system 206. Merchant system 206 may include one or more devices capable of being in communication with POS device 204, transaction processing system 208, issuer system 212, and/or the like. Merchant system 206 may include one or more computing devices, such as a server, a group of servers, and/or like devices. Said computing devices may include data storage devices.

Transaction processing system 208 may include one or more devices capable of being in communication with merchant system 206, acquirer system 211, issuer system 212, ATM 214, payment device 202, and/or other computing devices, such as a payment gateway. Issuer system 212 may include one or more devices capable of being in communication with payment device 202, transaction processing system 208, and/or the like. Acquirer system 211 may include one or more devices capable of being in communication with POS device 204, merchant system 206, transaction processing system 208, and/or the like, including payment gateways. Acquirer system 211, issuer system 212, and transaction processing system 208 may include one or more computing devices, such as a server, a group of servers, and/or like devices. Said computing devices may include data storage devices.

Non-transaction-based computer networks may include any number of computer nodes 102 connected and configured in a communication network 210, and may include one or more devices capable of being in communication with other computer nodes 102.

Monitoring computing device 218 may include one or more devices capable of being in communication with other computer devices in the environment 200, such that event data of events occurring in a networked system may be received, analyzed, and acted upon. Monitoring computing device 218 may include one or more computing devices, such as a server, a group of servers, and/or like devices. Monitoring computing device 218 may include one or more data storage devices for storing received event data. Monitoring computing device 218 may include a display for showing graphical representations of event data. Monitoring computing device 218 may include a user interface to facilitate user interaction with the graphical representation of event data. The monitoring computing device 218 may receive event data, generate a plurality of nested groups of the event data, generate display data to show a graphical representation of the event data, and receive or determine an identification of anomalous activity in the event data. The monitoring computing device 218 may provide for triggering responsive actions to rectify anomalies in the network.

The number and arrangement of devices and networks shown in FIG. 2 are provided as an example. There may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally or alternatively, a set of devices (e.g., one or more devices) of environment 200 may perform one or more functions described as being performed by another set of devices of environment 200.

Figure 3:
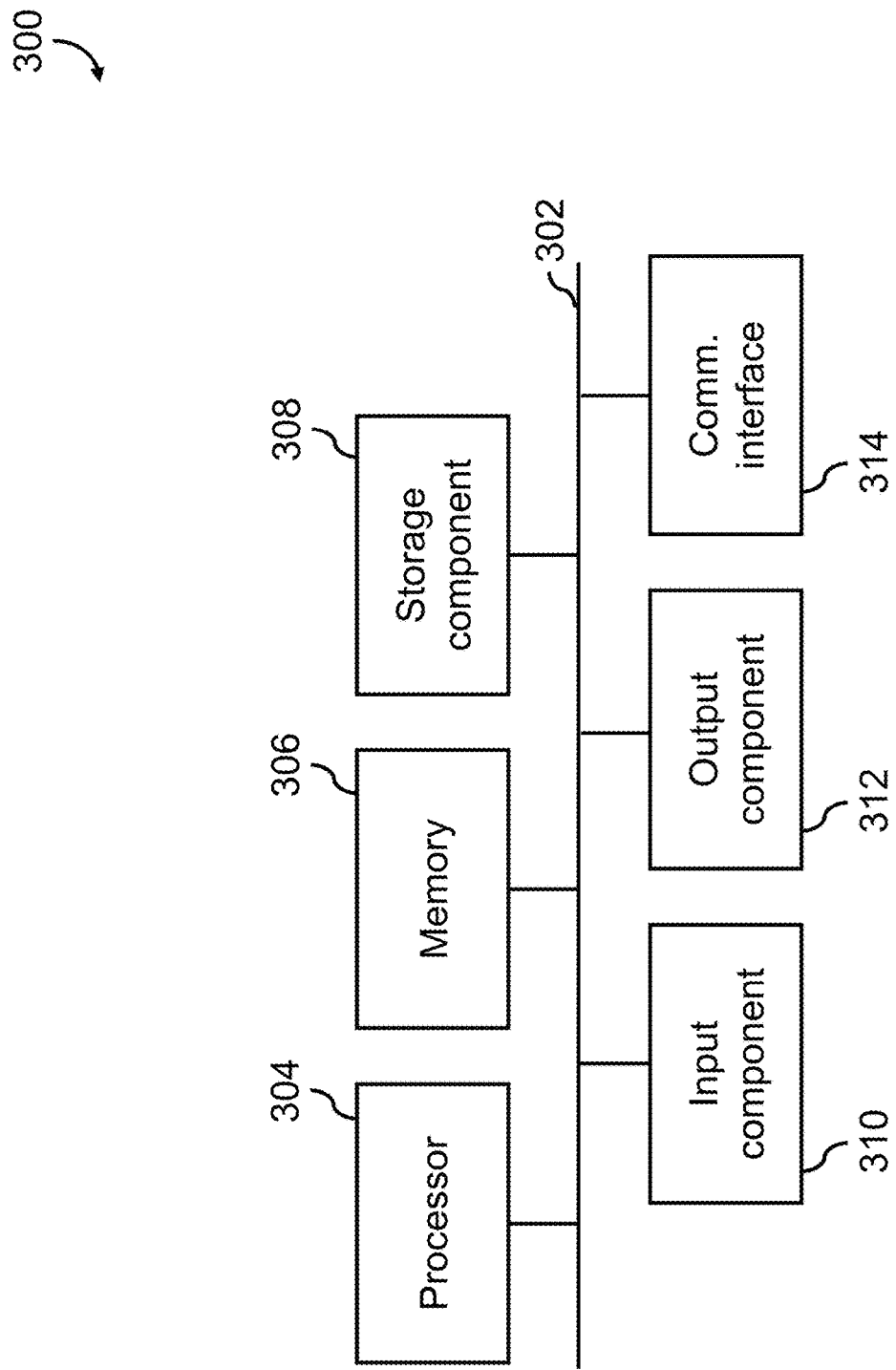
FIG. 3 is a diagram of a non-limiting embodiment or aspect of a computing device for deployment in the environment of FIG. 2.

Referring now to FIG. 3, illustrated is a diagram of example components of device 300. Device 300 may correspond to one or more devices of environment 200, including payment device 202, POS device 204, merchant system 206, acquirer system 211, issuer system 212, transaction processing system 208, computer node 102, third party payment device 216, ATM 214, and communication network 210. In some non-limiting embodiments or aspects, one or more devices of the foregoing may include at least one device 300 and/or at least one component of device 300. As shown in FIG. 3, device 300 may include bus 302, processor 304, memory 306, storage component 308, input component 310, output component 312, and communication interface 314.

Bus 302 may include a component that permits communication among the components of device 300. In some non-limiting embodiments or aspects, processor 304 may be implemented in hardware, software, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include random access memory (RAM), read-only memory (ROM), and/or another type of dynamic or static storage device (e.g., flash memory, magnetic memory, optical memory, etc.) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touchscreen display, a keyboard, a keypad, a mouse, a button, a switch, a microphone, a camera, etc.). Additionally or alternatively, input component 310 may include a sensor for sensing information (e.g., a global positioning system (GPS) component, an accelerometer, a gyroscope, an actuator, etc.). Output component 312 may include a component that provides output information from device 300 (e.g., a display, a speaker, one or more light-emitting diodes (LEDs), etc.).

Communication interface 314 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a WiFi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 306 and/or storage component 308 may include data storage or one or more data structures (e.g., a database, and/or the like). Device 300 may be capable of receiving information from, storing information in, communicating information to, or searching information stored in the data storage or one or more data structures in memory 306 and/or storage component 308. For example, the information may include encryption data, input data, output data, transaction data, account data, or any combination thereof.

The number and arrangement of components shown in FIG. 3 are provided as an example. In some non-limiting embodiments or aspects, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

Figure 4:
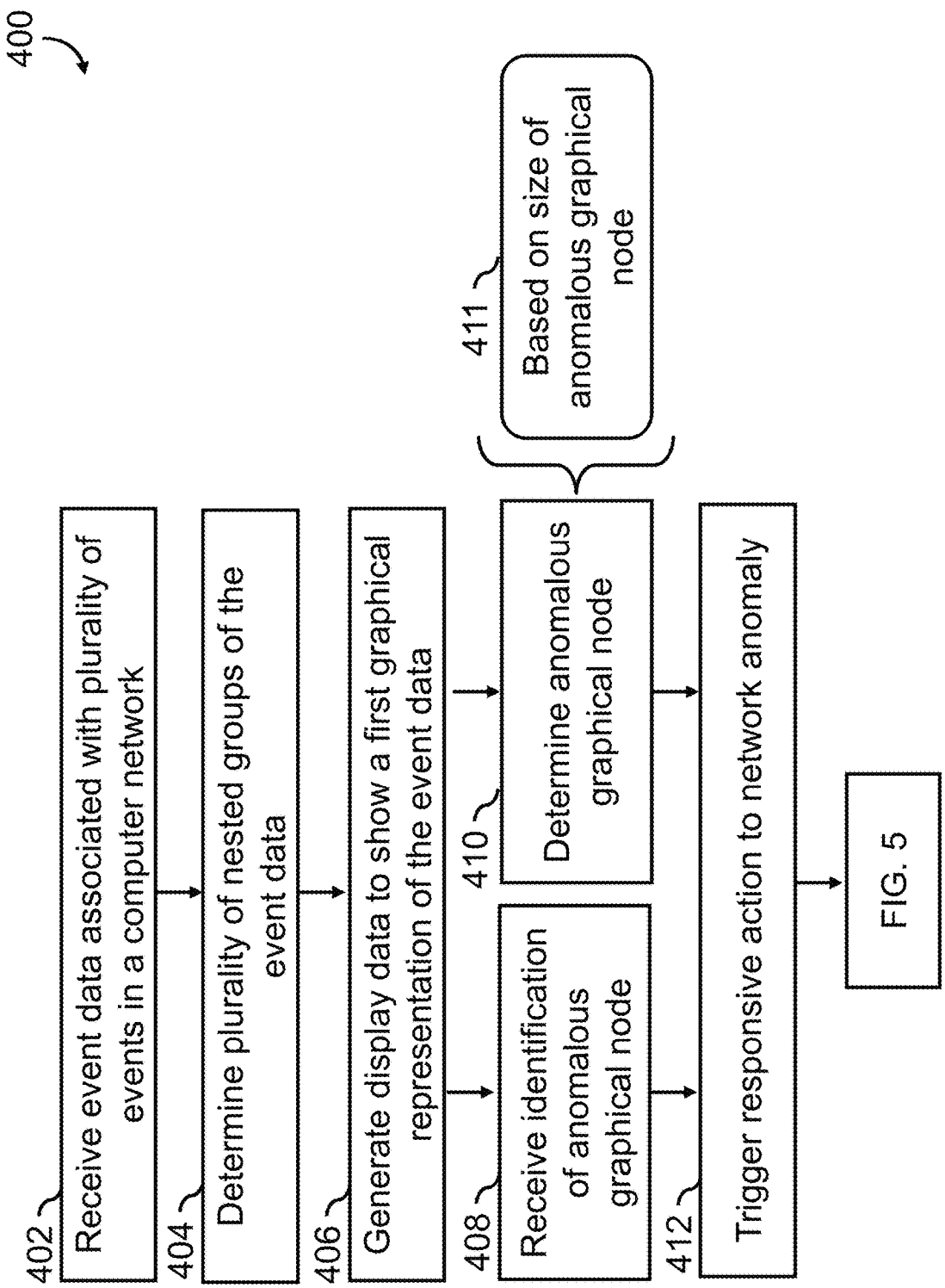
FIG. 4 is a flowchart illustrating a non-limiting embodiment or aspect of a method for network anomaly detection according to the principles of the present disclosure.

Referring now to FIG. 4, shown is a flowchart of a method 400 for network anomaly detection according to non-limiting embodiments or aspects of the present disclosure. One or more steps of method 400 may be executed by one or more computing devices, including transaction processing system 208, monitoring computing device 218, computer node 102, and/or another computing device. One or more steps of method 400 may be performed by a same or different device.

In step 402, event data may be received. For example, a monitoring computing device 218 may receive event data associated with a plurality of events in a computer network in a sample time period. Events may include, but are not limited to, network communications, such as transactions, messages, transmitted/requested data packets, and/or the like. An event may include a communication between at least two network computer nodes 102 of a plurality of computer nodes 102 in the computer network 100. Event data may include at least an aggregable (e.g., able to be aggregated) parameter. In the context of an electronic payment processing network, events may include transactions, event data may include transaction data, and the aggregable parameter may include transaction value, transaction count, and/or the like. In the context of computer networks, generally, the aggregable parameter may include data packet size, ping size, communication length, communication count, and/or the like.

In step 404, a plurality of nested groups of the event data may be determined. For example, the monitoring computing device 218 may determine a plurality of nested (e.g., contained within one another) groups of the event data. Groups may be determined based on operational hierarchy within a computer network. Additionally or alternatively, groups may be determined based on common features of events (e.g., location, time, device, etc.) in said groups. A lowest order group of the plurality of nested groups may include one or more computer nodes 102 of a plurality of computer nodes 102. Each group having a higher order than the lowest order group may include, nested in said each group, one or more other groups.

In step 406, display data may be generated. For example, the monitoring computing device 218 may generate display data configured to cause a display of the computing device 218 to show a first graphical representation of the event data. The first graphical representation may include a plurality of nested graphical nodes and at least one spline. The plurality of nested graphical nodes may have one-to-one correspondence with the plurality of computer nodes and the plurality of nested groups. In non-limiting embodiments or aspects, each graphical node of the plurality of nested graphical nodes may be associated with a group of the plurality of nested groups or a computer node 102 of the plurality of computer nodes (e.g., a graphical node may be provided for each computer node and for each subgroup). Each graphical node of the plurality of nested graphical nodes may encompass or be encompassed by another graphical node of the plurality of nested graphical nodes (e.g., a graphical node associated with a computer node 102 may be encompassed by a graphical node associated with a lowest order group, and a graphical node associated with a highest order group may encompass one or more lower order groups).

With further reference to the graphical representation of the event data, a size of each graphical node of the plurality of nested graphical nodes may be proportional to an aggregated value of the aggregable parameter of each event associated with a computer node 102 associated with the graphical node or a plurality of computer nodes 102 included in a group associated with the graphical node. For example, if a graphical node is associated with a computer node 102, the aggregable parameter for all events associated with the computer node 102 may be aggregated (e.g., for transactions, a transaction value may be aggregated for all transactions associated with the computer node 102). If the graphical node is associated with a group, all events associated with computer nodes 102 therein may be accounted for (e.g., for transactions, a transaction value may be aggregated for all transactions associated with all computer nodes 102 included in the group, including any subgroups therein). By way of further example, if the aggregable parameter is communication count (e.g., number of unique communications), and a first computer node received ten communications while a second computer node received one communication, a graphical node associated with the first computer node may be represented as bigger than the second computer node by a factor of ten (e.g., ten times bigger according to a linear scale, logarithmic scale, etc.). For a graphical node associated with a group that contains each of the first computer node and the second computer node, that graphical node may be represented as at least 1.1× bigger than the first node and at least 11× bigger than the second node (e.g., according to a linear scale, logarithmic scale, etc.). Graphical nodes that encompass other graphical nodes may be given an additional increase in size to allow for a salient representation of nested nodes.

With further reference to the graphical representation of the event data, each spline of the at least one spline may have endpoints including a pair of graphical nodes of the plurality of nested graphical nodes. Each spline may further include a curve that is generated from a path passing through a common graphical node that encompasses each of the endpoint graphical nodes. See FIGS. 7 and 8 and the associated discussion for further description on the generation of splines. Each spline may further be associated with a communication between at least two computer nodes of the plurality of computer nodes. For example, for a communication from a first computer node to a second computer node, a spline may represent a communication path between the first computer node and the second computer node (e.g., node to LAN, to router, to ISP, to NSP, etc., and back down to the receiving node). By way of further example, the communication may be a transaction communication in an electronic payment processing network, such as between two computing devices associated with and configured to manage respective transaction accounts, between an ATM and a payment device, and/or the like.

In step 408, an identification of an anomalous graphical node may be received. For example, the monitoring computing device 218 may receive, from a user interface, an identification of an anomalous graphical node of the plurality of nested graphical nodes. A user may interact with the graphical representation on the user interface to select a node and submit an identification of the node for further action.

Alternatively or additionally, in step 410, an identification of an anomalous graphical node may be determined. For example, the monitoring computing device 218 may determine an identification of an anomalous graphical node based on a size of the anomalous graphical node (in step 411) and/or the number of splines passing to or through said anomalous graphical node. With respect to node size, the anomalous graphical node may be detected when the size of the anomalous graphical node satisfies a threshold value relative to an average size of graphical nodes associated with a same group that is associated with the anomalous graphical node. For example, the monitoring computing device 218 may average the size and/or average the aggregated value of other nodes encompassed by a common node with the anomalous graphical node and may compare that average size and/or average aggregated value with the size and/or aggregated value of the anomalous graphical node. The threshold value may include a percent (e.g., 100% larger), ratio (e.g., 2:1), differential value, and/or the like. Satisfying the threshold value may include meeting and/or exceeding a threshold value, in a positive or negative direction (e.g., significantly larger or smaller than the average). Additionally or alternatively, the anomalous graphical node may be detected when the size of the anomalous graphical node satisfies a threshold value relative to an average size of the anomalous graphical node generated from event data in a plurality of prior time periods. For example, the monitoring computing device 218 may average the size and/or average the aggregated value for each node over multiple time periods and determine when a given node satisfies a threshold value relative to the average size and/or aggregated value of said node.

In step 412, one or more responsive actions to a network anomaly may be triggered. For example, the monitoring computing device 218, in response to the identification of an anomalous graphical node, may take one or more responsive actions to a network anomaly. Responsive actions may include, but are not limited to, communication alerts to network managers, activating disabled portions of the network, disabling active portions of the network, rerouting network communications, preventing communications through or between network components. In the context of an electronic payment processing network, the monitoring computing device 218 may decline one or more transactions (e.g., between computer nodes associated with the anomalous graphical node, associated with a graphical node encompassed by the anomalous graphical node, associated with a graphical node encompassing the anomalous graphical node, etc.) in a time period subsequent to the sample time period. The responsive action may further include declining all ongoing transactions between computer nodes in a group that is associated with the anomalous graphical node, associated with a graphical node that encompasses the anomalous graphical node, or associated with a graphical node encompassed by the anomalous graphical node.

Figure 5:
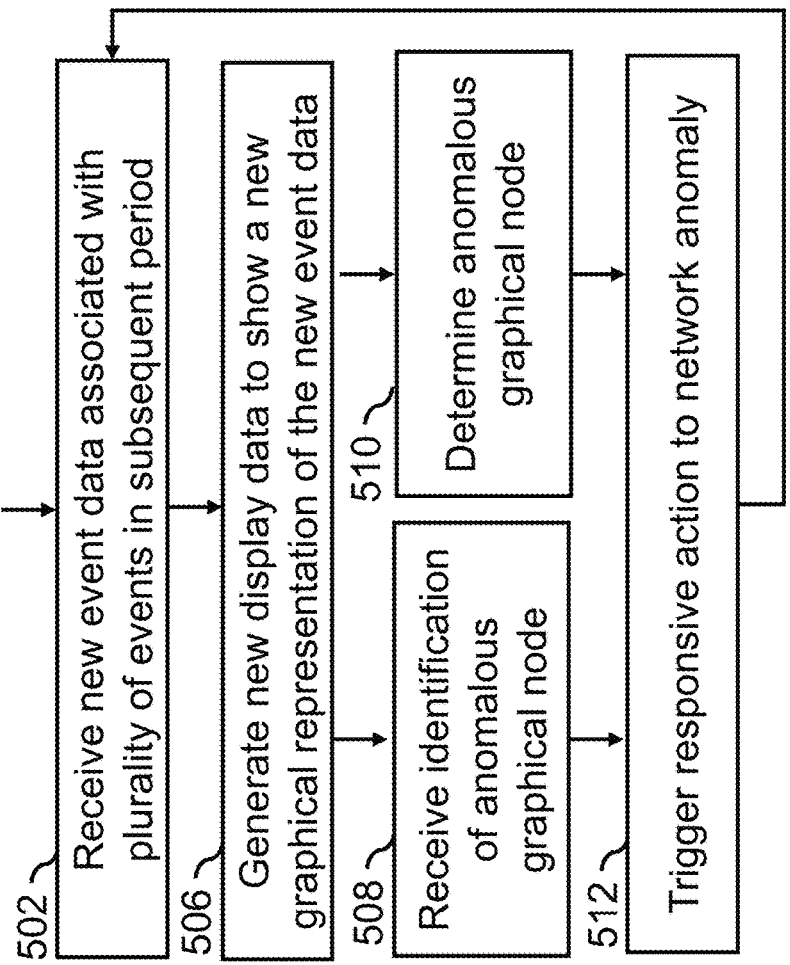
FIG. 5 is a flowchart illustrating a non-limiting embodiment or aspect of a method for network anomaly detection according to the principles of the present disclosure.

After step 406, and optionally after step 412, method 400 may proceed to the method illustrated in FIG. 5.

Referring now to FIG. 5, shown is a flowchart of a method 500 for network anomaly detection according to non-limiting embodiments or aspects of the present disclosure. One or more steps of method 500 may be executed by one or more computing devices, including transaction processing system 208, monitoring computing device 218, computer node 102, and/or another computing device. One or more steps of method 500 may be performed by a same or different device.

In step 502, new event data may be received. For example, a monitoring computing device 218 may receive new event data associated with a plurality of new events in the computer network in a subsequent time period after the sample time period.

In step 506, new display data may be generated. For example, the monitoring computing device 218 may generate new display data configured to cause a display of the computing device 218 to show a new graphical representation of the new event data. The new graphical representation may be displayed using a same set of graphical parameters as the first graphical representation, including, but not limited to, the parameters of displaying nested graphical nodes and splines. The nested graphical nodes and splines may be related to the same groups applied to the new event data. In this manner, the same node in the first graphical representation and the new graphical representation may be a different size as the aggregated value of aggregable parameters of event data associated therewith may change. Furthermore, the number of splines between graphical nodes may change. See FIGS. 9-11 for a comparison of graphical representations of a large-scale network.

In step 508, an identification of an anomalous graphical node may be received. For example, the monitoring computing device 218 may receive, from a user interface, an identification of an anomalous graphical node of the plurality of nested graphical nodes. A user may interact with the graphical representation on the user interface to select a node and submit an identification of the node for further action. The identification may be determined based on a size of the anomalous graphical node being increased or decreased in the new graphical representation relative to the first graphical representation.

Alternatively or additionally, in step 510, an identification of an anomalous graphical node may be determined. For example, the monitoring computing device 218 may determine an identification of an anomalous graphical node based on a size of the anomalous graphical node and/or the number of splines passing to or through said anomalous graphical node in the new graphical representation relative to the first graphical representation. With respect to node size, the anomalous graphical node may be detected when the size of the anomalous graphical node satisfies a threshold value relative to the size of the same node in the first graphical representation.

In step 512, one or more responsive actions to a network anomaly may be triggered. For example, the monitoring computing device 218, in response to the identification of an anomalous graphical node, may take one or more responsive actions to a network anomaly. After taking one or more responsive actions, the method 500 may cycle back to step 502 and repeat steps 506, 508, and/or 510. If no anomalous graphical node is detected in a given graphical representation relative to a previous graphical representation, including the first or second graphical representations generated, the method 500 may also cycle back to step 502 and repeat steps 506, 508, and/or 510.

Figure 6:
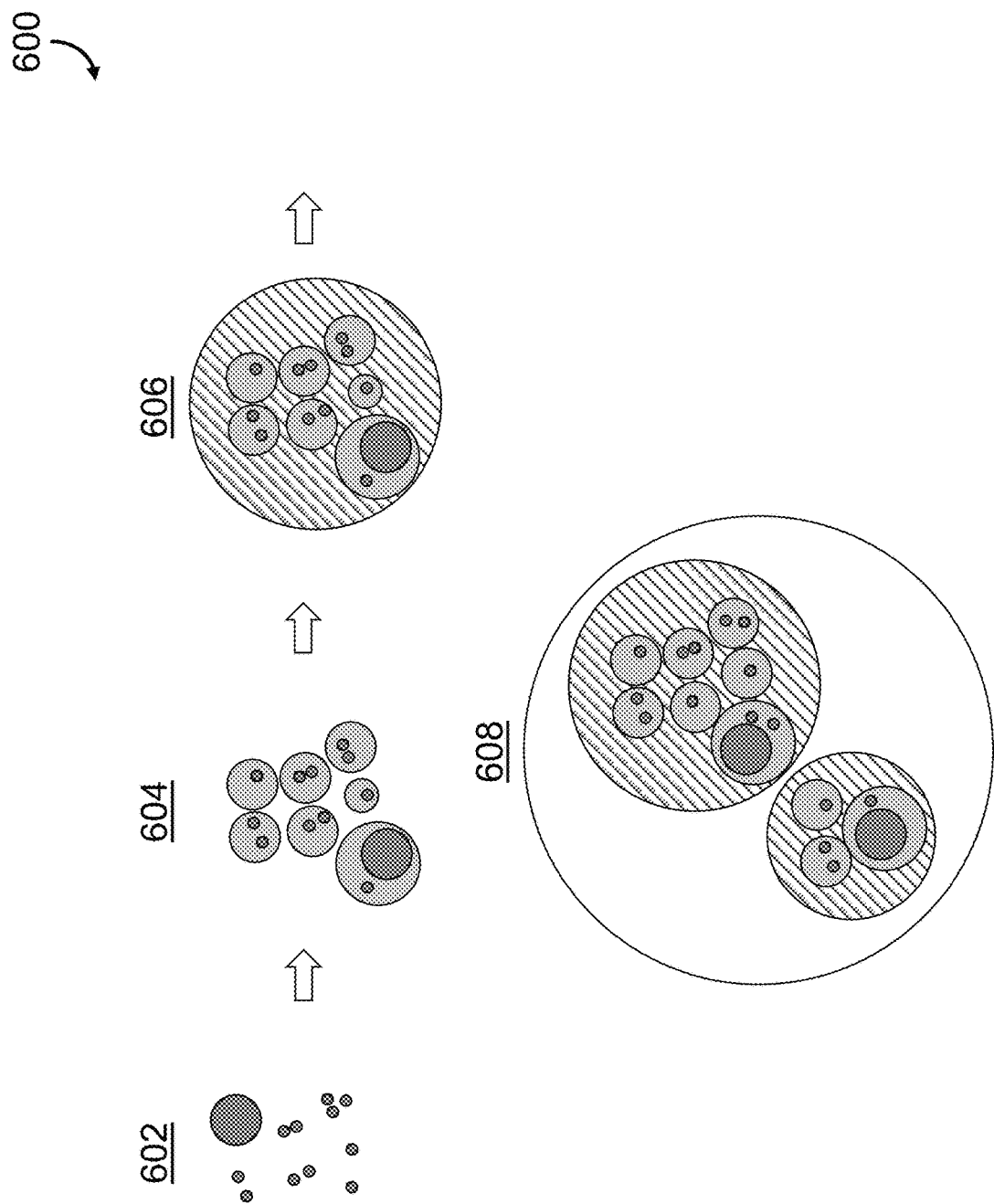
FIG. 6 is a stepwise diagram illustrating generation of a graphical representation of event data according to non-limiting embodiments or aspects of a method for network anomaly detection.

Referring now to FIG. 6, illustrated is a diagram of a process 600 according to non-limiting embodiments or aspects of the present disclosure. Process 600 may be executed by one or more computing devices, including transaction processing system 208, monitoring computing device 218, computer node 102, and/or another computing device. Process 600 illustrates a bottom-up generation of a graphical representation.

In step 602, computer nodes are represented by graphical nodes according to aggregated value of a parameter of events associated with the computer nodes. For example, one graphical node in step 602 is ten times larger than the other graphical nodes. This may represent the aggregated value of the computer node associated with the graphical node being ten times more than the value of the other computer nodes associated with the other graphical nodes.

In step 604, the graphical nodes from step 602 are encompassed by graphical nodes in step 604. Each graphical node added in step 604 is associated with a respective lowest order group of computer nodes. The size of the graphical nodes added in step 604 are likewise proportional to the aggregated value of all nodes contained therein. It will be appreciated that one graphical node added in step 604 that encompasses the larger graphical node from step 602 is likewise larger than other graphical nodes added in step 604.

In step 606, the graphical nodes from step 604 are encompassed by a graphical node in step 606. The graphical node added in step 606 is associated with a higher order group that contains the groups of computer nodes from step 604. The single graphical node added in step 606 signifies that all of the graphical nodes in step 604 are associated with, and encompassed by, a common group in step 606. The size of the graphical node added in step 606 is likewise proportional to the aggregated value of all nodes contained therein.

In step 608, the graphical node from step 606 is paired with another set of graphical nodes in step 608. The highest order graphical node in step 608 may be considered a common ancestor to the lower order graphical nodes it contains. While the graphical representation of event data in step 608 does not include splines, see FIGS. 7 and 8 for a detailed discussion of spline generation.

While graphical nodes are represented across steps 602, 604, 606, and 608 in relatively fixed positions for the ease of understanding, it will be appreciated that the generation of graphical representations of a computer network may involve the moving of graphical nodes to accommodate the various groupings thereof during generation. Furthermore, the positioning of the nodes may be optimized so that larger nodes are generally positioned toward the center of the graphical representation, further improving salience.

Figure 7:
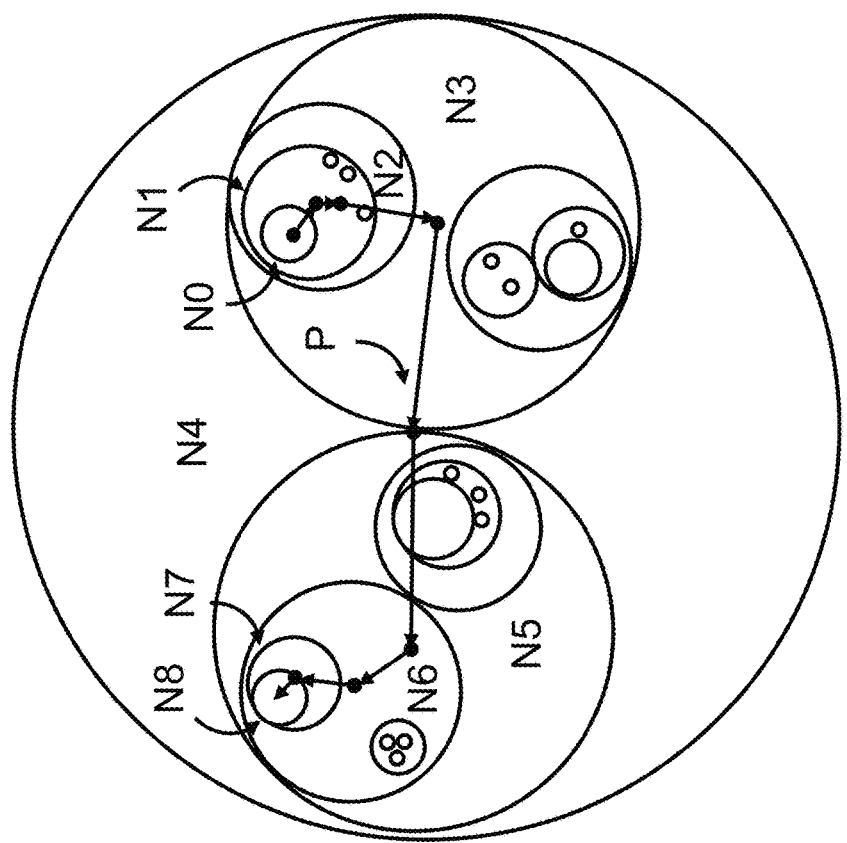
FIG. 7 is a diagram illustrating generation of a graphical representation of event data, including a spline, according to non-limiting embodiments or aspects of a method for network anomaly detection.
Figure 8:
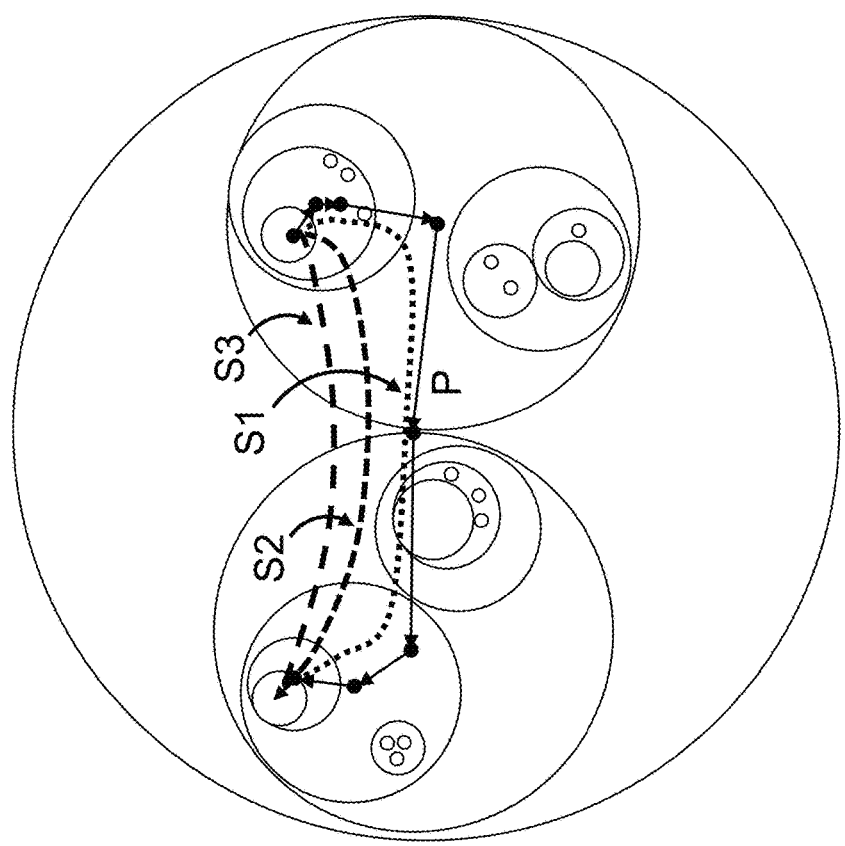
FIG. 8 is a diagram illustrating generation of a graphical representation of event data, including a plurality of splines, according to non-limiting embodiments or aspects of a method for network anomaly detection.

Referring now to FIGS. 7 and 8, illustrated is a schematic diagram of processes 700, 800 for generating splines according to non-limiting embodiments or aspects of the present disclosure. Processes 700, 800 may be executed by one or more computing devices, including transaction processing system 208, monitoring computing device 218, computer node 102, and/or another computing device.

With specific reference to FIG. 7, process 700 illustrates an initial path-finding step for the generation of a spline to connect node N0 to node N8. Process 700 includes the determination of a path that connects node N0 to node N8 through a lowest common ancestor node, via higher order nodes of each of node N0 and node N8. Starting from node N0, a path is identified to the next higher order node including node N0, which is node N1. The process is repeated until the lowest common ancestor node is identified (e.g., the lowest order node that encompasses each of node N0 and node N8). As shown in FIG. 7, a path is determined as follows: N0<N1<N2<N3<N4. Node N4 is the lowest common ancestor node of each of node N0 and node N8. The path then proceeds through subsequent lower order graphical nodes until node N8 is reached. Therefore, the complete path is as follows: N0<N1<N2<N3<N4>N5>N6>N7>N8.

With specific reference to FIG. 8, process 800 illustrates generation of various splines by generating curves from the initial path produced by process 700. While the generated path already provides increased salience over a straight-line path that connects node N0 directly to node N8, the path can be further optimized to form a spline. The formula for generating a spline curve from the initial path is as follows:

$$N'_i = \beta \cdot N_i + (1-\beta)\left(N_0 + \frac{i}{C-1}(N_{C-1} - N_0)\right)$$ Formula 1 where N' represents modified nodes, N represents initial nodes, i represents the node index, and β represents bundling strength, set in a range of [0, 1]. For further guidance on generating a spline according to the above formula, see Danny Holten, *Hierarchical Edge Bundles: Visualization of Adjacency Relations in Hierarchical Data*, IEEE Transactions on Visualization and Computer Graphics, September 2006, pp. 741-48, Vol. 12(5). Spline S1 has the lowest bundling strength, spline S2 has a higher bundling strength, and spline S3 has the highest bundling strength. The bundling strength may be chosen so that the graphical data required to represent a spline is reduced while also preserving the information contained therein regarding the underlying path. Multiple paths may be plotted according to process 700 and multiple splines may be generated therefrom according to process 800. In a graphical representation including a number of nested graphical nodes and a number of splines, increased rates of communications may be identified by clusters of splines passing through common graphical nodes.

Figure 9:
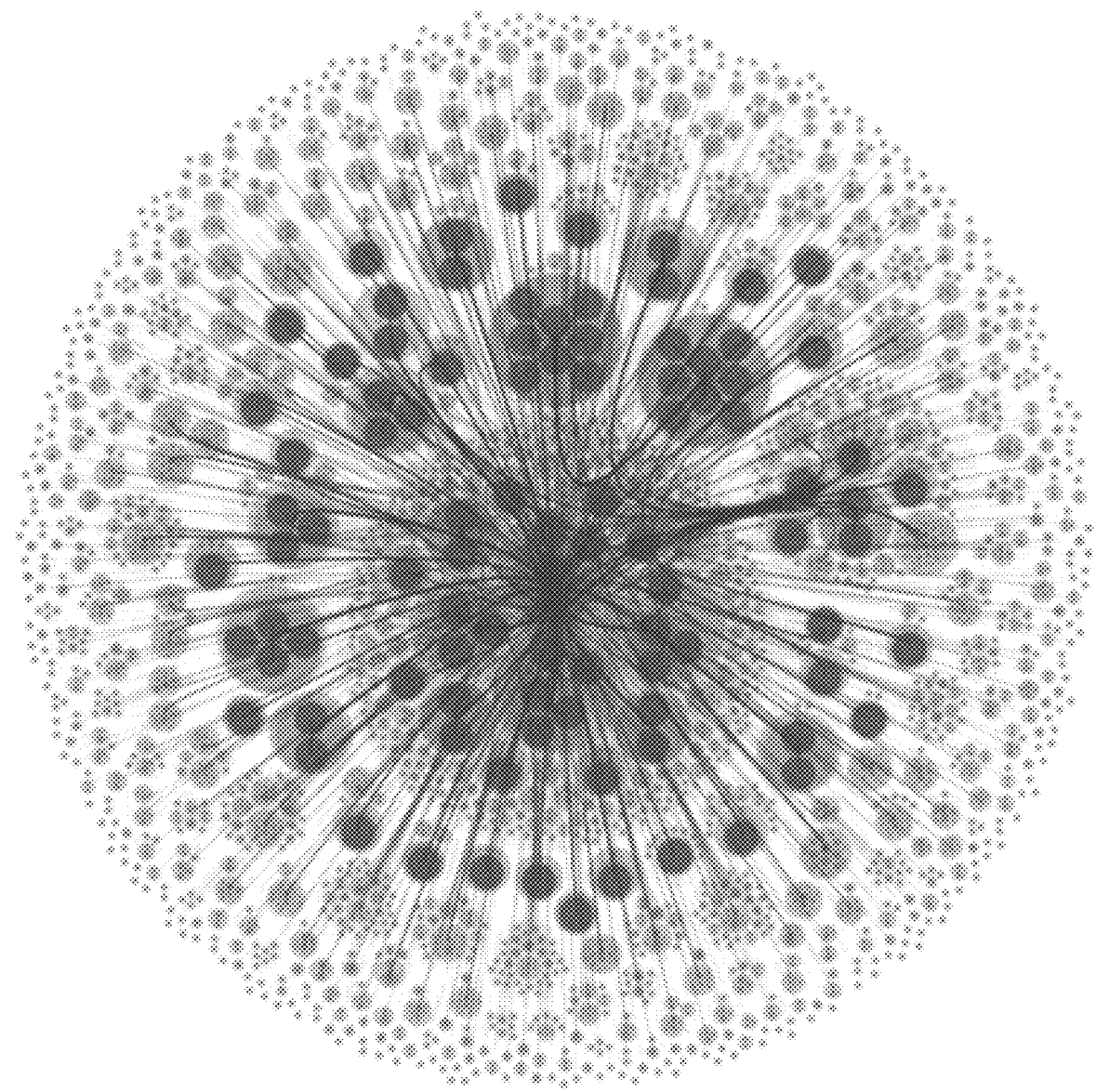
FIG. 9 is an exemplary illustration of a graphical representation of event data for a large-scale network, without anomalous activity, according to non-limiting embodiments or aspects of a method for network anomaly detection.

Referring to FIG. 9, illustrated is an exemplary diagram of a first graphical representation 900 of event data from a large-scale network in a sample time period, generated according to non-limiting embodiments or aspects of the present disclosure. The first graphical representation 900 includes a plurality of nested graphical nodes, where the largest graphical nodes, including the highest order graphical nodes, are generally positioned in the center of the first graphical representation 900. Furthermore, network events (e.g., communications) from the event data are shown in the first graphical representation 900 by splines that connect the lowest order of graphical nodes via a path plotted through a lowest common ancestor. First graphical representation 900 illustrates the general nature of certain graphical nodes being larger than others, representing differences in aggregated value associated therewith.

Figure 10:
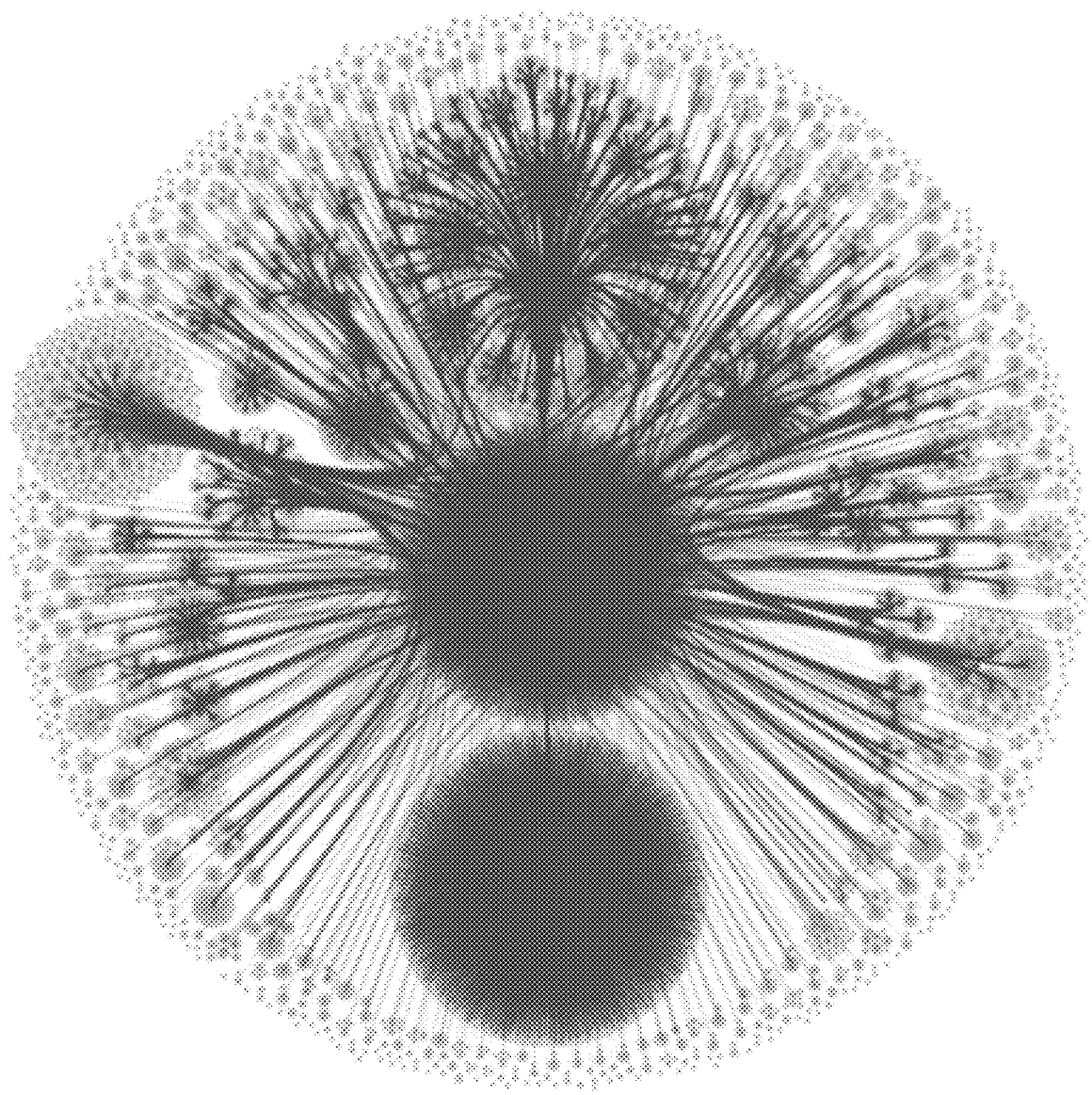
FIG. 10 is an exemplary illustration of a graphical representation of event data for a large-scale network, with anomalous activity, according to non-limiting embodiments or aspects of a method for network anomaly detection.

Referring to FIG. 10, illustrated is an exemplary diagram of a new graphical representation 1000 of new event data from a large-scale network featuring multiple anomalies in a subsequent time period, generated according to non-limiting embodiments or aspects of the present disclosure. The new graphical representation 1000 includes a same plurality of nested graphical nodes, where the largest graphical nodes, including the highest order graphical nodes, are generally positioned in the center of the new graphical representation 1000. Furthermore, network events (e.g., communications) from the new event data are shown in the new graphical representation 1000 by splines that connect the lowest order of graphical nodes via a path plotted through a lowest common ancestor. New graphical representation 1000 illustrates the network anomalies by virtue of at least two anomalous graphical nodes. In particular, two nodes in the center and center-left of the new graphical representation 1000 are significantly larger (e.g., have significantly higher aggregated value) in comparison to historic sizes of those graphical nodes, or in comparison to other graphical nodes generated from the same period of data. Moreover, the number and convergence of a high number of splines through the anomalous graphical nodes may be used as an independent or additional basis for identifying the anomalous graphical nodes.

Referring to FIG. 11, illustrated is an exemplary diagram of a user interface 1100 for displaying graphical representations 900, 1000 of event data, generated according to non-limiting embodiments or aspects of the present disclosure. The user interface 1100 is configured to display event data from a sample time period in a first graphical representation 900 and new event data from a subsequent time period in a new graphical representation 1000. The user interface further includes an interactive timeline 1102 that may allow a user to select a time period and view a corresponding graphical representation 900, 1000 generated from event data taken from the selected time period. As depicted, a user has selected two dates ("January 24" and "January 26") that correspond to the two graphical representations 900, 1000. The exemplary user interface 1100 illustrates ordering the graphical representations 900, 1000 relative to one another in order of time period. Alternatively, the user interface 1100 may allow a user to select and view one time period and corresponding graphical representation at a time 900, 1000. The interactive timeline 1102 may further be color coded so that each selectable time period is identifiable by likely anomalous activity (e.g., "January 26", corresponding to the anomalous activity shown in the new graphical representation 1000, may be color-coded as red to signal a user that anomalous activity was detected; "January 24", by comparison, may be color-coded blue to signal a user that no anomalous activity was detected). It will further be appreciated that the user interface may allow a user to zoom into a graphical representation 900, 1000 to review and compare graphical nodes.

With further reference to FIG. 11, the graphical representation of event data may allow for a user to select or hover over a graphical node and receive information about the node, including its aggregated value. Graphical nodes may be represented by a nested data structure. In the example of representing transaction event data, the highest order graphical nodes may be designated by a BID (e.g., "Bid103") and may have an aggregate value of all transactions for all transaction accounts for all BINs associated therewith (e.g., $15,497). The next lower order graphical node may be designated by a BID and a BIN (e.g., "Bid103.bin221") and may have an aggregate value of all transactions for all transaction accounts associated therewith (e.g., $2,354). The next lower order graphical node may be designated by a BID, a BIN, and an account identifier (e.g., "Bid103.bin221.account762") and may have an aggregate value of all transactions associated therewith (e.g., $110). Individual transactions to and from accounts may be designated by a BID, a BIN, an account identifier, and a transaction identifier (e.g., "Bid103.bin221.acount762.transID123") and may be associated with an individual aggregable value (e.g., $100).

In the example of representing the same transaction event data from an ATM-location perspective, the highest order graphical nodes may be designated by a country identifier (e.g., "USA") and may have an aggregate value of all transactions for all ATMs for all cities associated therewith (e.g., $5,673). The next lower order graphical node may be designated by a country identifier and a city identifier (e.g., "USA.Austin") and may have an aggregate value of all transactions for all ATMs associated therewith (e.g., $254). The next lower order graphical node may be designated by a country identifier, city identifier, and ATM identifier (e.g., "USA.Austin.dev01") and may have an aggregate value of all transactions associated therewith (e.g., $20). Individual transactions with ATMs (e.g., withdrawals) may be designated by a country identifier, city identifier, ATM identifier, and transaction identifier (e.g., "USA.Austin.dev01.transID03") and may be associated with an individual aggregable value (e.g., $10). It will be appreciated that similar techniques may be applied to create nested groups and data structures therefor for generating graphical representations of event data of various computer networks.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
receiving, with at least one processor, event data associated with a plurality of events in a computer network in a sample time period, the event data comprising an aggregable parameter and each event of the plurality of events comprising a communication between at least two network computer nodes of a plurality of computer nodes in the computer network;
determining, with at least one processor, a plurality of nested groups of the event data, wherein a lowest order group of the plurality of nested groups comprises a group of at least one computer node of the plurality of computer nodes, and wherein each group of the plurality of nested groups having a higher order than the lowest order group comprises, nested therein, at least one other group of the plurality of nested groups; and
generating, with at least one processor, display data configured to cause a display of a computing device to show a first graphical representation of the event data, the first graphical representation comprising a plurality of nested graphical nodes and at least one spline;
wherein,
each graphical node of the plurality of nested graphical nodes is associated with a group of the plurality of nested groups or a computer node of the plurality of computer nodes,
each graphical node of the plurality of nested graphical nodes encompasses and/or is encompassed by another graphical node of the plurality of nested graphical nodes,
a size of each graphical node of the plurality of nested graphical nodes is proportional to an aggregated value of the aggregable parameter of each event associated with a computer node associated with the graphical node or a plurality of computer nodes comprised by a group associated with the graphical node,
each spline of the at least one spline has endpoints comprising a pair of graphical nodes of the plurality of nested graphical nodes and comprises a curve that is generated from a path passing through a common graphical node that encompasses each graphical node of the pair of graphical nodes, and
each spline of the at least one spline is associated with a communication between at least two computer nodes of the plurality of computer nodes.

2. The method of claim 1, wherein the plurality of events comprise a plurality of transactions, the computer network comprises an electronic payment processing network, the event data comprises transaction data associated with the plurality of transactions, and the aggregable parameter comprises transaction value.

3. The method of claim 2, wherein each computer node of the plurality of computer nodes comprises a computing device configured to manage transactions to and from at least one transaction account.

4. The method of claim 3, further comprising:
receiving, with at least one processor, an identification of an anomalous graphical node of the plurality of nested graphical nodes from a user interface of the computing device; and
declining, with at least one processor in a time period subsequent to the sample time period, at least one transaction between computer nodes in a group of the plurality of nested groups associated with the anomalous graphical node or with a graphical node encompassing the anomalous graphical node.

5. The method of claim 4, further comprising declining all ongoing transactions between computer nodes in a group of the plurality of nested groups associated with the anomalous graphical node or with a graphical node encompassing the anomalous graphical node.

6. The method of claim 2, further comprising:
receiving, with at least one processor, new event data associated with a plurality of new events in the computer network in a subsequent time period after the sample time period;
generating, with at least one processor, new display data configured to cause the display of the computing device to show a new graphical representation of the new event data, wherein the new graphical representation is displayed using a same set of graphical parameters as the first graphical representation, and wherein the new graphical representation is displayed in time order relative to the first graphical representation;
receiving, with at least one processor, an identification of an anomalous graphical node in the new graphical representation from a user interface of the computing device, wherein the identification is determined based on a size of the anomalous graphical node increased in the new graphical representation relative to the first graphical representation; and
declining, with at least one processor, at least one transaction between computer nodes in a group of the plurality of nested groups associated with the anomalous graphical node or with a graphical node encompassing the anomalous graphical node.

7. The method of claim 1, further comprising determining, with at least one processor, an identification of an anomalous graphical node based on a size of the anomalous graphical node satisfying a threshold value relative to an average size of graphical nodes associated with a same group that is associated with the anomalous graphical node.

8. The method of claim 1, further comprising determining, with at least one processor, an identification of an anomalous graphical node based on a size of the anomalous graphical node generated from event data in the sample time period satisfying a threshold value relative to an average size of the anomalous graphical node generated from event data in a plurality of prior time periods.

9. A system comprising a server comprising at least one processor, the server programmed and/or configured to:
receive event data associated with a plurality of events in a computer network in a sample time period, the event data comprising an aggregable parameter and
each event of the plurality of events comprising a communication between at least two network computer nodes of a plurality of computer nodes in the computer network;
determine a plurality of nested groups of the event data, wherein a lowest order group of the plurality of nested groups comprises a group of at least one computer node of the plurality of computer nodes, and wherein each group of the plurality of nested groups having a higher order than the lowest order group comprises, nested therein, at least one other group of the plurality of nested groups; and
generate display data configured to cause a display of a computing device to show a first graphical representation of the event data, the first graphical representation comprising a plurality of nested graphical nodes and at least one spline; wherein,
each graphical node of the plurality of nested graphical nodes is associated with a group of the plurality of nested groups or a computer node of the plurality of computer nodes,
each graphical node of the plurality of nested graphical nodes encompasses and/or is encompassed by another graphical node of the plurality of nested graphical nodes,
a size of each graphical node of the plurality of nested graphical nodes is proportional to an aggregated value of the aggregable parameter of each event associated with a computer node associated with the graphical node or a plurality of computer nodes comprised by a group associated with the graphical node,
each spline of the at least one spline has endpoints comprising a pair of graphical nodes of the plurality of nested graphical nodes and comprises a curve that is generated from a path passing through a common graphical node that encompasses each graphical node of the pair of graphical nodes, and
each spline of the at least one spline is associated with a communication between at least two computer nodes of the plurality of computer nodes.

10. The system of claim 9, wherein the plurality of events comprise a plurality of transactions, the computer network comprises an electronic payment processing network, the event data comprises transaction data associated with the plurality of transactions, and the aggregable parameter comprises transaction value.

11. The system of claim 10, wherein the server is further programmed and/or configured to:
receive an identification of an anomalous graphical node of the plurality of nested graphical nodes from a user interface of the computing device; and
decline, in a time period subsequent to the sample time period, at least one transaction between computer nodes in a group of the plurality of nested groups associated with the anomalous graphical node or with a graphical node encompassing the anomalous graphical node.

12. The system of claim 10, wherein the server is further programmed and/or configured to:
receive new event data associated with a plurality of new events in the computer network in a subsequent time period after the sample time period;
generate new display data configured to cause the display of the computing device to show a new graphical representation of the new event data, wherein the new graphical representation is displayed using a same set of graphical parameters as the first graphical representation, and wherein the new graphical representation is displayed in time order relative to the first graphical representation;
receive an identification of an anomalous graphical node in the new graphical representation from a user interface of the computing device, wherein the identification is determined based on a size of the anomalous graphical node increased in the new graphical representation relative to the first graphical representation; and decline at least one transaction between computer nodes in a group of the plurality of nested groups associated with the anomalous graphical node or with a graphical node encompassing the anomalous graphical node.

13. The system of claim 9, wherein the server is further programmed and/or configured to determine an identification of an anomalous graphical node based on a size of the anomalous graphical node satisfying a threshold value relative to an average size of graphical nodes associated with a same group that is associated with the anomalous graphical node.

14. The system of claim 9, wherein the server is further programmed and/or configured to determine an identification of an anomalous graphical node based on a size of the anomalous graphical node generated from event data in the sample time period satisfying a threshold value relative to an average size of the anomalous graphical node generated from event data in a plurality of prior time periods.

15. A computer program product comprising at least one non-transitory computer-readable medium including program instructions that, when executed by at least one processor, cause the at least one processor to:

receive event data associated with a plurality of events in a computer network in a sample time period, the event data comprising an aggregable parameter and each event of the plurality of events comprising a communication between at least two network computer nodes of a plurality of computer nodes in the computer network;

determine a plurality of nested groups of the event data, wherein a lowest order group of the plurality of nested groups comprises a group of at least one computer node of the plurality of computer nodes, and wherein each group of the plurality of nested groups having a higher order than the lowest order group comprises, nested therein, at least one other group of the plurality of nested groups; and generate display data configured to cause a display of a computing device to show a first graphical representation of the event data, the first graphical representation comprising a plurality of nested graphical nodes and at least one spline; wherein, each graphical node of the plurality of nested graphical nodes is associated with a group of the plurality of nested groups or a computer node of the plurality of computer nodes, each graphical node of the plurality of nested graphical nodes encompasses and/or is encompassed by another graphical node of the plurality of nested graphical nodes, a size of each graphical node of the plurality of nested graphical nodes is proportional to an aggregated value of the aggregable parameter of each event associated with a computer node associated with the graphical node or a plurality of computer nodes comprised by a group associated with the graphical node, each spline of the at least one spline has endpoints comprising a pair of graphical nodes of the plurality of nested graphical nodes and comprises a curve that is generated from a path passing through a common graphical node that encompasses each graphical node of the pair of graphical nodes, and each spline of the at least one spline is associated with a communication between at least two computer nodes of the plurality of computer nodes.

16. The computer program product of claim 15, wherein the plurality of events comprise a plurality of transactions, the computer network comprises an electronic payment processing network, the event data comprises transaction data associated with the plurality of transactions, and the aggregable parameter comprises transaction value.

17. The computer program product of claim 16, wherein the program instructions further cause the at least one processor to:

receive an identification of an anomalous graphical node of the plurality of nested graphical nodes from a user interface of the computing device; and decline, in a time period subsequent to the sample time period, at least one transaction between computer nodes in a group of the plurality of nested groups associated with the anomalous graphical node or with a graphical node encompassing the anomalous graphical node.

18. The computer program product of claim 16, wherein the program instructions further cause the at least one processor to:

receive new event data associated with a plurality of new events in the computer network in a subsequent time period after the sample time period;

generate new display data configured to cause the display of the computing device to show a new graphical representation of the new event data, wherein the new graphical representation is displayed using a same set of graphical parameters as the first graphical representation, and wherein the new graphical representation is displayed in time order relative to the first graphical representation;

receive an identification of an anomalous graphical node in the new graphical representation from a user interface of the computing device, wherein the identification is determined based on a size of the anomalous graphical node increased in the new graphical representation relative to the first graphical representation; and decline at least one transaction between computer nodes in a group of the plurality of nested groups associated with the anomalous graphical node or with a graphical node encompassing the anomalous graphical node.

19. The computer program product of claim 15, wherein the program instructions further cause the at least one processor to determine an identification of an anomalous graphical node based on a size of the anomalous graphical node satisfying a threshold value relative to an average size of graphical nodes associated with a same group that is associated with the anomalous graphical node.

20. The computer program product of claim 15, wherein the program instructions further cause the at least one processor to determine an identification of an anomalous graphical node based on a size of the anomalous graphical node generated from event data in the sample time period satisfying a threshold value relative to an average size of the anomalous graphical node generated from event data in a plurality of prior time periods.

* * * * *